Patented Aug. 14, 1945

2,382,327

UNITED STATES PATENT OFFICE 2,382,327

PROCESS OF PREPARING STABILIZED SYNTHETIC FLUOALUMINATE

Charles B. Miles, Upper Darby, Pa., assignor to The Pennsylvania Salt Manufacturing Company, Philadelphia, Pa., a corporation of Pennsylvania No Drawing. Application February 9, 1943, Serial No. 475,277

13 Claims. (Cl. 23—88)

The present invention relates to a process for the treatment of synthetic fluoaluminates, for example the alkali metal fluoaluminates of the cryolite and chiolite type; and more particularly it relates to the treatment of synthetic fluoaluminates, characterized by loss of fluorine upon heating, to convert such fluoaluminates into products which do not lose an appreciable amount of fluorine when subjected to high temperature, for example, in the case of synthetic cryolite, temperatures as high as about 700° C. The term "fluoaluminate" is defined as the double fluoride of aluminum and another metal, and is exemplified by cryolite with a formula of $Na_3AlF_6$ or chiolite with a formula of $Na_5Al_3F_{14}$. The term "double fluoride" includes compositions of dissimilar structure; e. g. mixtures or pure compounds wherein there are present as the principal constituents fluorine, aluminum, and one or more additional metals.

The present application is a continuation-in-part of application Serial Number 430,997, filed February 14, 1942.

Heretofore, the use of certain synthetic fluoaluminates in the industrial fields has presented difficulties due to the fact that they lose acidic fluorine compounds upon heating. This liberation of fluorine not only represents an economic loss but constitutes a hazard when such fluoaluminates are used in a molten bath such as is employed in the manufacture of aluminum. An examination of a number of synthetic fluoaluminates made in accordance with the usual methods of manufacture has shown that the liberation of fluorine upon heating is a common fault. For example, analyses of sixteen different samples of synthetic cryolite average 86.9% $Na_3AlF_6$ (cryolite) with 4.84% ignition loss at 700° C., the samples yielding detectable acid vapor in substantially every instance. The loss of hydrofluoric or equivalent acid may amount to as much as one-half of the ignition loss, and this volatile acid may be due to decomposition of hydrofluoaluminic acids or basic or other fluorides or may be generated by autohydrolysis of hydrates of aluminum fluoride which may be unavoidably co-precipitated with the fluoaluminate. The bulk of the acid can be liberated only at relatively high temperature, although some acid may be found at low temperature by titration with alkali.

Consideration of the structure of synthetic fluoaluminates gives a clue to a possible source of this relatively volatile acidic impurity. Indications are that, upon application of heat to synthetic fluoaluminates of the type under consideration, a rearrangement or realignment of the ionic constituents occurs resulting in the formation of molecules of free acid. X-ray analyses indicate that fluoaluminates consist in general of chains of $AlF_6$ octahedra joined by metallic cations which more or less completely fill the spaces between the chains. If the fluoaluminate is formed in aqueous medium, hydrates are possible. Thus, the hydrate $K_2AlF_5 \cdot H_2O$ is known and the water in this compound is reversibly removable between about 130° C. and 230° C. Similarly, a compound of the approximate formula $Na_{2.6}AlF_{5.6} \cdot 0.4H_2O$ is known. It has further been shown that ionic concentrations and pH of the aqueous precipitating medium have a direct influence upon the formula of the precipitated fluoaluminate. The structures of the hydrates may be supposed to be quite similar to those of the anhydrous materials, but with $H^+$ ions substituting in part for the metallic cations and with $OH$ groups replacing combined F atoms. On this basis, it is understandable that loss of HF should accompany volatilization of $H_2O$ upon application of heat. The mobile $H^+$ ion may unite either with $OH$ or $F$ ions. The data and theories herein discussed are recorded in the interest of clarifying the nature of the invention and are not to be construed as limiting the scope of the invention.

In the interest of further clarification, a distinction is made within the scope of the present invention between two types of fluorine volatilization losses characteristic of fluoaluminates:

(1) High temperature losses, i. e., sublimation of metal fluorides and atmospheric oxidation and hydrolysis of constituent fluorides. Such losses are characteristic of all fluoaluminates, and occur in the case of natural cryolite to an appreciable extent at temperatures of about 700° C. and higher, the higher temperatures rapidly increasing the extent of such losses; and (2) Low temperature losses characteristic of certain synthetic fluoaluminates, i. e., losses of acidic fluorine compounds arising through thermal decomposition of co-precipitated impurities or of replacement compounds as hereinbefore described. These losses constitute an important part of the loss on ignition values ordinarily determined at about 600° C.–700° C., and may be of appreciable magnitude at even lower temperatures.

When the terms "loss of fluorine," "volatilizable fluorine," "volatilizable acid," and the like are employed in this disclosure, it is to be understood that the reference is mainly to the second named of the two types of fluorine volatilization losses. The present invention is not directed to a process which eliminates fluorine losses of the first named type.

The principal object of the present invention is to provide an inexpensive process by which a synthetic fluoaluminate, such as cryolite and chiolite, which undergoes loss of fluorine upon heating, may be converted into a product which will not suffer an appreciable loss of fluorine at relatively high heat.

Still another object of the present invention is to provide a process whereby the objectionable fuming features common to most synthetic fluoaluminates is overcome and a product performing much like the purified natural material is obtained.

I have found that volatilization of acid is particularly objectionable in the case of a fluoaluminate (e. g. cryolite) precipitated from a highly acidic medium and that this acid is not loosely held acid such as might be expected to be present by occlusion of acid mother liquor. Such a precipitation process, however, is valuable since it allows formation of a highly granular and hence very filtrable product. Further, the use of highly acidic precipitating media causes many objectionable contaminating impurities to pass into the mother liquor instead of being occluded or co-precipitated with the solid product. Examples of such acid processes are cited in U. S. Patent No. 1,873,727. A further object of the present invention, therefore, is to enable operation of desirable acid precipitation processes while realizing all the advantages of a product containing no volatilizable acidic fluorine compounds.

Other objects will be apparent from a consideration of the specification and claims.

The process of the present invention comprises the treatment of a fluoaluminate, characterized by loss of fluorine upon heating, with an amount of alkaline material sufficient to fix or stabilize the volatilizable fluorine compound so that upon heating the treated product will not lose an appreciable amount of fluorine. The alkaline material is mixed with the fluoaluminate after separation of the latter from the solution in which it is produced and before it has been subjected to temperatures sufficiently high to effect volatilization of said fluorine. The alkaline material may be chosen from any one of a number of hydroxides, oxides, or alkaline salts, such as the hydroxides or carbonates of the alkali metals, sodium or potassium aluminate, activated aluminum oxide, aluminum hydroxide, calcium or magnesium oxide or any other substance which will serve to fix the fluoaluminate by suppressing the liberation of acidic fluorine compounds. Preferably, the alkaline material is selected with reference to the impurities which its use may add to the fluoaluminate. Thus, for example, sodium hydroxide is employed in preference to potassium hydroxide for the treatment of a synthetic cryolite.

The amount of alkaline materal added to the fluoaluminate is sufficient to fix the volatilizable acid present in the fluoaluminate and the alkaline material may be added in an excess of that required, if desired. An excess of the material is capable of reacting to an appreciable extent with the fluoaluminate so that a strongly alkaline product is not a necessary consequence of the use of a slight excess of alkaline material.

The excess of alkaline material employed is preferably sufficient to insure complete fixing of volatilizable acid but may, if desired, be sufficient to make up for any deficiency of alkali metal in the product desired. Thus, it has been found that synthetic cryolite prepared by the acid processes previously mentioned will usually lack sufficient sodium to correspond to the formula $Na_3AlF_6$. It is within the scope of the claims to fix or stabilize such a double fluoride and to so determine the quantity of alkaline material that the alkali metal content will substantially correspond to the formula of the desired compound or at least be brought nearer to it.

The optimum amount of alkaline material employed depends upon the particular alkali used, the composition or nature of the synthetic fluoaluminate, and the degree of residual alkalinity which may be tolerated in the resulting product. This optimum amount must be determined empirically. Generally, the alkali is employed in several-fold excess of the amount stoichiometrically equivalent to the volatilizable acid. Thus, for example, the residual free alkali (as $Na_2O$), found by acidimetric titration in products resulting from treating portions of a synthetic cryolite with (a) aqueous soda ash equivalent to 2.5% acid, calculated as HF, in the original cryolite, and (b) aqueous NaOH equivalent to 2.5% acid, calculated as HF, in the original cryolite was (a) 3.17% and (b) 0.73%, after drying the products at 115° C. In a similar experiment, NaOH equivalent to 1.5% acid, calculated as HF, was used to fix the acid and the residual free alkali was found to be 0.38% (as $Na_2O$). This lesser amount of caustic sufficed to fix the approximately 0.75% acid, calculated as HF, volatilizable at 600° C., but still smaller amounts were insufficient.

There is no critical upper limit upon the amount of alkali employed other than that the amount be insufficient to render the product unacceptable for its intended use, the product being applicable for any of a wide variety of uses. Obviously, the amount of alkaline material mixed with the fluoaluminate will preferably be at least sufficient to stabilize substantially the volatilizable fluorine compounds. In general, the $Na_2O$ alkalimetric equivalent of the alkali material mixed with the fluoaluminate will not be more than about 15 weight per cent. of the resulting mixture, and in most cases, the amount will be lower than about 10%. A satisfactory product for use in the electrolytic production of aluminum results when the amount of alkaline material mixed with the fluoaluminate is limited to a reasonably small value, suitably about 2% to 5%, on the stated basis. As an example, the "$Na_2O$ alkalimetric equivalent" of 2.65 grams NaOH (i. e., 2.05 grams $Na_2O$) is 2% of the weight of the composition obtained by mixing 2.65 grams NaOH and 100 grams cryolite. As a further example, the "$Na_2O$ alkalimetric equivalent" of 5 grams CaO is calculated to be about 5.54 grams (of $Na_2O$). Obviously, smaller amounts may be employed although with very small amounts of alkaline material complete stabilization may not be realized.

The alkaline material may be mixed with the finely divided dry fluoaluminate or with a moist product, such as the filtered and washed fluoaluminate precipitate prior to drying, at which step in the process of the production of the fluoaluminate the product may contain from about 15% to 60% water, generally in the neighborhood of 15% to 40% water. In accordance with the present invention, the alkaline material is not added to the solution containing the ingredients which react to form the fluoaluminate or to the solution containing the fluoaluminate precipitate in suspension, but as herein pointed out, it is mixed with the dry or moist fluoaluminate, that is, subsequent to the separation of the fluoaluminate from the solution in which it is produced. The alkaline material in finely divided dry form or in aqueous or other solution may be mixed with the dry or moist fluoaluminate. For example, when a dry product is treated, a dry alkaline material may be mechanically mixed therewith, and, if desired, after the dry materials are mixed, water may be added thereto. A completely dry mix is not prefererd, however, since somewhat larger amounts of alkaline material must be employed and more attention must be given to uniformity of mixing in order to prevent loss of fluorine upon heating, because the volatilizable fluorine is fixed at the time of its liberation at elevated temperatures, i. e., the dry alkali does not penetrate the fluoaluminate grains at low temperatures. In the case of the treatment of a moist fluoaluminate, the alkaline material added thereto is advantageously in aqueous or other solution to insure thorough mixing, but dry alkaline material may be used, if desired. After the preparation of the mixture of the fluoaluminate and the alkaline material, the product, if moist, may be dried at any commercially practical temperature, for example, 100°–200° C.

The dry product, prepared from dry ingredients or in the presence of water and dried, may be distributed to the trade without further treatment and may be used industrially with assurance that no appreciable amount of fluorine will be liberated upon heating. In the case of this product, the losses in weight upon heating to a relatively high temperature are largely due to carbon dioxide and/or water, little or no fluorine loss being encountered.

If an excess of alkaline material has been used, as previously stated, it is capable of reacting with the fluoaluminate. In such cases, the product may be heated at a temperature as low as 100°–125° C. when an alkali metal hydroxide has been employed, and at a temperature within the range 400° to 700° C. when an alkali carbonate has been employed to obtain a substantially alkali-free product.

The product, if heated at a sufficiently high temperature, will be capable of withstanding relatively high heat without substantial ignition loss, that is to say, if such a product is desired, the time-temperature conditions of heat-treatment are selected so that upon completion of the heat-treatment, a product is produced which when used industrially, for example, in the case of synthetic cryolite, at temperatures of 700° C. or higher, will compare favorably, with respect to any type volatilization loss, with natural cryolite. The use of temperatures of about 400° C. or higher up to the melting point of the product, for example 400° C. to 700° C., will produce a product from which water and/or carbon dioxide will have been largely removed and in which the easily volatile portions of the fluorine content will have been converted into compounds volatilizable only at higher temperatures. It is to be understood that in the case the alkaline material employed reacts with the fluoaluminate at a relatively low temperature to produce a substantially alkali-free material, the product may be subjected to two heat-treatments, the first producing the substantially alkali-free material and the second furnishing the product with substantially no loss on ignition, as above stated, but, since nothing is to be gained thereby, the use of a sufficient temperature in a single heat-treatment to accomplish both purposes is recommended, when a product of the described properties is desired. It is also to be understood that a product which is not convertible into an alkali-free product at a relatively low temperature may be subjected to the heat-treatment described to produce a product with substantially no loss on ignition.

The following examples are illustrative of the present invention and the treatment of cryolite has been selected as the preferred embodiment of the invention:

Example I

To 100 grams of finely divided dry synthetic cryolite, about 7 grams (more or less depending on the amount of volatilizable acid present) of dry finely divided soda ash are added. After intimately mixing the cryolite and soda ash, the product may be packaged and shipped to the trade. If desired, the mixture may be heated to a temperature in the range of 400° C. to 700° C. for a period of time dependent upon the temperature employed and the percentage of volatilizable acid present. The heating at lower temperatures within the range, for example from 400° C. to 500° C., usually requires about one hour. The time of treatment may be lessened by an increase in the temperature used. Most of the excess alkaline material reacts with the fluoaluminate and carbon dioxide and water are evolved, and a very stable cryolite is produced in which the proportions of sodium, aluminum, and fluorine are substantially those of natural cryolite.

Example II

To 100 grams (calculated on dry weight) of the filtered, washed, and moist synthetic cryolite, a sufficient amount of a strong solution of soda ash is added to equal about 7 grams of $Na_2CO_3$. After intimately mixing the cryolite and the soda ash solution, the product is dried. The dried product may be marketed, without further heating, or it may be subjected to the heat-treatment described in Example I, in which latter case, as hereinbefore pointed out, the product may be used industrially at elevated temperatures with assurance that the product will be comparable to natural cryolite.

Example III

To 100 grams (calculated on the dry weight) of filtered, washed, and moist synthetic cryolite, a sufficient amount of a strong aqueous solution of sodium hydroxide is added to adjust the mixture so that the weight ratio of NaOH to $Na_3AlF_6$ is equal to 0.03 and so that the weight ratio $H_2O$ to $H_2O$ plus $Na_3AlF_6$ is about 0.18. The product is then dried for about one hour at 125° C. The alkalinity of the dried product will equal about 0.5% titratable NaOH and there is no acid loss upon heating. Ignition at 600° C. then eliminates water and the product contains only sodium, aluminum, and fluorine in combination as stable as that in natural cryolite.

I claim:

1. The process of treating a sub-divided, solid synthetic fluoaluminate characterized by loss of fluorine upon heating, which comprises mixing an alkaline material with said sub-divided, solid synthetic fluoaluminate subsequent to its separation from the solution in which it is produced and prior to its subjection to temperatures sufficiently high to effect volatilization of said fluorine, the $Na_2O$ equivalent of said alkaline material being not more than about 15 weight per cent. of the resulting mixture on the dry basis.

2. The process of claim 1 wherein the amount of alkaline material mixed with the fluoaluminate is sufficient to stabilize substantially said fluorine, and the $Na_2O$ equivalent thereof is not more than about 10 weight per cent of the resulting mixture.

3. The process of claim 1 wherein the synthetic fluoaluminate is synthetic cryolite, the alkaline material is selected from the group of sodium hydroxide and sodium carbonate, and the amount of alkaline material mixed with the fluoaluminate is sufficient to stabilize substantially said fluorine, and the $Na_2O$ equivalent thereof is not more than about 5 weight per cent. of the resulting mixture.

4. The process of claim 1 wherein the synthetic fluoaluminate is synthetic cryolite, the alkaline material is sodium hydroxide, and the $Na_2O$ equivalent of said sodium hydroxide is between about 2% and 5% by weight of the resulting mixture.

5. The process of treating a sub-divided, solid synthetic fluoaluminate characterized by loss of fluorine upon heating, which comprises mixing an alkaline material with said sub-divided, solid synthetic fluoaluminate subsequent to its separation from the solution in which it is produced and prior to its subjection to temperatures sufficiently high to effect volatilization of said fluorine, the $Na_2O$ equivalent of said alkaline material being not more than about 15 weight per cent. of the resulting mixture on the dry basis, and heating the product at a temperature within the range 100° to 700° C.

6. The process of claim 5 wherein the amount of alkaline material mixed with the fluoaluminate is sufficient to stabilize substantially said fluorine and the $Na_2O$ equivalent thereof is not more than about 10 weight per cent. of the resulting mixture.

7. The process of claim 5 wherein the synthetic fluoaluminate is synthetic cryolite, and the amount of alkaline material mixed with the fluoaluminate is sufficient to stabilize substantially said fluorine and the $Na_2O$ equivalent thereof is not more than about 10 weight per cent. of the resulting mixture.

8. The process of claim 5 wherein the synthetic fluoaluminate is synthetic cryolite, and the alkaline material is caustic soda, the $Na_2O$ equivalent of said caustic soda is between about 2% and about 5% by weight of the resulting mixture.

9. The process of claim 5 wherein the synthetic fluoaluminate is synthetic cryolite, the alkaline material is sodium carbonate, the amount of sodium carbonate mixed with the fluoaluminate is sufficient to stabilize substantially said fluorine and the $Na_2O$ equivalent thereof is not more than about 5 weight per cent. of the resulting mixture, and the product is heated at a temperature within the range of 400°–700° C.

10. The process of treating a sub-divided, solid synthetic fluoaluminate characterized by loss of fluorine upon heating, which comprises mixing an alkaline material in the presence of water with said sub-divided, solid synthetic fluoaluminate subsequent to its separation from the solution in which it is produced and prior to its subjection to temperatures sufficiently high to effect volatilization of said fluorine, the $Na_2O$ equivalent of said alkaline material being not more than about 15 weight per cent. of the resulting product on the dry basis, and drying the product.

11. The process of claim 10 wherein the amount of alkaline material is sufficient to stabilize substantially said fluorine and the $Na_2O$ equivalent thereof is not more than about 10 weight per cent. of the resulting mixture.

12. The process of claim 10 wherein the synthetic fluoaluminate is synthetic cryolite, the alkaline material is selected from the group consisting of sodium hydroxide and sodium carbonate, the amount of alkaline material mixed with the fluoaluminate is sufficient to stabilize substantially said fluorine, and the $Na_2O$ equivalent thereof is not more than about 5 weight per cent of the resulting mixture, and the product is heated at a temperature within the range 100° to 700° C.

13. The process of claim 10 wherein the synthetic fluoaluminate is synthetic cryolite, the alkaline material is sodium hydroxide, and the $Na_2O$ equivalent of said sodium hydroxide is between about 2% and about 5% by weight of the resulting mixture.

CHARLES B. MILES.